UNITED STATES PATENT OFFICE 1,956,770

METHOD OF CANNING FOODSTUFFS

John T. McCrosson, Port Au Prince, Haiti

No Drawing. Application July 25, 1931,
Serial No. 553,195

5 Claims. (Cl. 99—8)

This invention relates to a new and improved method of canning foodstuffs and to the product of said method, with saving in cost, speed, and efficiency of production.

One of the objects of this invention is the creation of a new and improved method of canning foodstuffs employing prechosen impregnating preservatives of high efficiency with regard to the preservation effect that they will have on the foodstuffs to be canned and which tend, because of their character, to minimize the time needed for cooking in a sterilizing bath.

Another object of this invention is the creation of a method of canning foodstuffs which will faithfully preserve the taste and fresh qualities of the foodstuffs, such as fruits, vegetables, or the like, which are canned.

A still further object of this invention is the creation of a new and improved method of canning foodstuffs consisting in removing air therefrom and substituting a prechosen preservative of high efficiency in the interstices of the food which were formerly occupied by the air, removing all of the preservative excepting that within the interstices of the foodstuff, sealing the foodstuff in vacuum and sterilizing said foodstuff while in said vacuum without the use of additional preservative and by the aid of such steam as may be produced from juices of the foodstuff and such vapors as may be formed from the preservative impregnated in said foodstuff.

Various other objects and advantages of the invention than those hereinabove mentioned will appear more fully hereinafter.

It is to be understood that the specific form of the process hereinafter set out is merely illustrative and hence the detailed description thereof is not to be taken as limiting the invention itself.

The invention resides substantially in the steps, combination, relative arrangement and sequence of steps, as well as in the novel product produced thereby, all as will be more fully pointed out hereinafter.

Under present practice it is customary to can fruit and vegetables and other foodstuffs in syrups of various densities, depending on the foodstuff to be canned, as well as the variety and quality of the pack to be obtained. The foodstuff is prepared by paring, coring and slicing or dicing, as the case may be. The prepared foodstuff is then placed in a container which is filled with a syrup, or the like. The filled but unsealed containers are then conveyed from an exhaust box or chamber, where said containers and the contents thereof are heated either by steam jets which play thereon, or by submerging the said containers in a hot bath to heat the contents before sealing and thereby driving out some of the air and creating a partial vacuum in the can when it has cooled. The cans are then sealed in a vacuum sealer or in a standard sealing machine, after which they are processed in an open or closed retort for a definite time at a prechosen temperature, depending upon the amount of heat required. The duration of the processing in usual cases varies from eight to forty minutes for proper sterilization, most of this time being required on account of the syrup through which the heat must penetrate to reach the foodstuff, penetrate to the interior thereof and sterilize the same. The long period of time which is therefore necessary in the hot bath usually results in the heat thereof cooking the foodstuff to such an extent that most of the original flavor and food qualities are lost.

In my United States Letters Patent No. 1,782,761, issued November 25, 1930, I have disclosed a new and improved method of canning pineapples. In said patent I have pointed out, as above, the many difficulties attendant the customary canning process which is in common use, and further point out how, by my novel process therein disclosed, I was able to successfully can pineapple and retain most of the desirable qualities of the fresh fruit. The satisfactory and economical preservation of the pineapple fresh fruit qualities, attained by the process disclosed by my patent, was due to the fact that the time consumed in practicing the method therein disclosed to sterilize the pineapple was cut to nearly one-quarter the time ordinarily needed, and no heavy sugar syrup was used to deaden the fruit flavor.

As a result of further experimentation with my process, I have discovered that the "dry" process disclosed in my Letters Patent above identified may be, by the use of proper additional features, successfully adapted to the canning of all types of canned foodstuffs, such as fruits, vegetables, or the like.

By my method the foodstuffs are properly prepared for canning, as is now done, and are filled into the cans which are then subjected to a vacuum which exhausts all the air and confined gases from the interstices of the foodstuff being canned. After the air and gases have been substantially completely exhausted from the food under treatment, a preservative is substituted to fill up the interstices previously occupied by the air or gas. I could, of course, optionally first fill over my foodstuff the preservative to be used, then remove the air or gas from the pores of the foodstuff and permit the atmospheric pressure to effect impregnation by forcing the preservative into the evacuated air and/or gas cells. Preferably however a more complete and effective evacuation and impregnation is attained by practicing the process just above set out. After impregnation the can is drained of excess preservative and sealed in a vacuum and then heat processed to effect sterilization of the relatively "dry" contents.

In my patent above mentioned I have discussed syrup as a favorable substance to be used for replacing the air and gas withdrawn from the interstices. Further experimentation has disclosed however that other preservatives, such as alcohol, an alcohol derivative or compound, or alcohol diluted with a brine, saccharine or combination brine and saccharine solution all of which have the alcoholic constituent thereof of a temperature of volatilization which is less than that of water more perfectly accomplish a complete preserving effect. The alcohol obviously having a low temperature of volatilization will tend to also reduce the time needed finally for complete sterilization of the can and foodstuff therein contained.

It is quite obvious that when foodstuffs, such as vegetables, are filled into a can a syrup preservative, if used, would be undesirable, not only because of the heavy flavor which it would lend to the ultimate product, but also because it is necessary to apply heat for a comparatively long period of time at a high temperature to insure proper sterilization thereof. With vegetables of various kinds, a brine has usually been found to constitute a good possible preservative for substitution in the interstices or within the body thereof. However, even though usually satisfactory, it has been found that even when brine is drained from a can that it carries with it much of the desirable qualities of the vegetables.

I have found that, after the air and gases have been exhausted from the article, usually an alcoholic mixture of from 5 to 95% strength, depending upon the fruit, vegetable, or other foodstuff being treated, if admitted to the container while under a high vacuum, fills up the interstices between the product being treated and more thoroughly penetrates it when the vacuum is ultimately broken. The fruit, vegetable, or other foodstuff being impregnated with alcohol, one of the most excellent of preservatives, will, due to its low temperature of volatilization, when later subjected to the processing bath after sealing immediately give off an alcoholic vapor which, due to the presence of the vacuum in the can, will wholly surround, penetrate and sterilize the contents of said container with much more rapidity than had merely brine or syrup been used.

In the case of vegetables, it will, of course, be found to be usually desirable to use alcohol, or alcohol compound, of a low percentage in the impregnating bath in order to prevent the ultimate article from carrying a rum taste. Even, however, when a low percentage alcohol impregnating agent is used, but a relatively low final processing temperature is necessary to vaporize the alcohol agent which has saturated the vegetable, and no objectionable flavor or odor remains after sterilization which is accomplished by vaporization of the alcohol agent.

With fruits where higher strength alcohol may be satisfactorily used, as much of the flavor of the impregnating liquid may be retained as is found desirable by proof of the liquid used. To carry out my invention therefore the foodstuff is prepared, placed in the can, the air and gases in the interstices thereof are removed under a prechosen vacuum, a preservative, such as alcohol, an alcohol derivative or compound, an alcohol diluted with a brine, saccharine or combination solution, or even brine or syrup is filled into the can to cover over the foodstuff having exhausted interstices. The vacuum is broken and the pressure of the atmosphere on the surface of the liquid forces said liquid into said interstices and impregnates the foodstuffs.

The containers are then drained of all free excess preservative, excepting that which has been forced under air pressure into the body of the foodstuff that is being treated. The vacuum still being maintained in the container and the container being empty, except for the impregnated foodstuff, it is sealed under a high vacuum and then processed, as usual, but for a duration of time which is usually about one-fifth of the time usually required under present methods. Due to the fact that the time required for processing is materially decreased, it is obvious that proper sterilization in no way affects the quality of the fresh article being treated. Further than this, by using an alcoholic agent as a preservative in place of either syrup or brine, as the case may be, it is possible to retain the original flavor of the foodstuff.

In most cases, as I have pointed out in my prior patent, the process of filling up the interstices can be materially shortened by subjecting the article that is to be impregnated in small pieces or crushed to the action of the vacuum, the foodstuff being placed for that purpose in a suitable receptacle from which the air is exhausted to about 28½ inches, or more, of vacuum.

It is even possible, as above mentioned, to practice my invention by withdrawing the air or gases from the interstices of the foodstuff that is being treated while the same is inundated under the preservative that is to be used, in which case the air or gases would, of course, have to be drawn up through the preservative fluid.

The ultimate processing of my product in the absence of air and in the presence of merely an alcohol vapor, or other perservative vapor, leaves with said product a better flavor as no oxidation obviously can take place. As ultimately produced, the article that has been canned is within the container and merely surrounded by a preservative vapor, a "dry" packing being thereby obtained. During the processing step the foodstuff is necessarily, therefore, cooked in the vapor formed from the preservative as well as in the steam produced from the moisture and juice of the foodstuff. Since the article is in a vacuum, surrounded merely by an alcoholic or otherwise preservative vapor, it is quite clear that a very small period of time is necessary to effect the heating, cooking, and sterilization of the foodstuff that is canned. Further than this, it is quite obvious that the cans, after cooking, will quickly cool and eliminate all danger of over-cooking or stack-burning. The advantage of "dry" packing presents the obvious advantage of reduced weight of the ultimate case, which advantage is proportionately present with cans of smaller or larger size.

Inasmuch as many changes may be made in the above method and many apparently widely and different embodiments of the scope of the invention may be made without departing from the spirit and scope thereof, it is intended that all matter hereinabove contained shall be interpreted as illustrative, and not in any way limiting. The following claims are intended to cover all of the generic and specific features of the invention described.

What I seek to secure by United States Letters Patent:

1. The method of canning foodstuffs which consists in withdrawing the air or gas from substantially all of the interstices throughout the body thereof and completely replacing the same with an alcoholic agent under pressure.

2. A method of canning foodstuffs which consists in removing air from the same, substituting an alcoholic agent in the interstices of the foodstuff formerly occupied by the air, then removing substantially all of said agent except that within the interstices of the foodstuff, then sealing the foodstuff in vacuum without any additional quantity of the alcoholic agent, and then heating and sterilizing the foodstuff while in said vacuum by the aid of the vapor of the alcoholic agent in the interstices and the steam produced from the juices and fluids of the foodstuffs.

3. The method of canning foodstuffs in a closed container which consists in evacuating the interstices of the foodstuffs by exhausting the container in vacuum, covering the foodstuffs with alcohol, then admitting air to the container to force the alcohol into said interstices to saturate the evacuated cells of the foodstuff, then draining the foodstuff to remove substantially all but the saturating alcohol, then sealing the container under vacuum and heating the foodstuff while in said vacuum, thus producing alcohol vapor and steam within the container under varying pressure dependent upon the temperature to which said container is heated, and thereby sterilizing the interior thereof and the foodstuffs penetrated by the alcohol.

4. The method of canning foodstuffs which consists in covering pieces thereof with an alcoholic preservative in a closed container, removing air from the pieces by exhausting the container in a high vacuum, admitting air to force the alcoholic preservative into the evacuated cells of the foodstuffs to saturate the same, draining the foodstuff to remove therefrom substantially all but the saturating preservative, then sealing the container thereof under vacuum, and then heating and sterilizing said foodstuffs while in said vacuum.

5. The method of canning foodstuffs which consists in covering pieces thereof with an alcohol in a closed container, removing air from the pieces by exhausting the container in a high vacuum, admitting air to force the alcohol into the evacuated cells of the foodstuffs to saturate the same, draining the foodstuff to remove therefrom substantially all but the saturating alcohol, then sealing the container thereof under vacuum, and then heating and sterilizing said foodstuffs while in said vacuum.

JOHN T. McCROSSON